United States Patent
Burger et al.

(10) Patent No.: US 12,284,083 B2
(45) Date of Patent: Apr. 22, 2025

(54) METHOD AND SYSTEM FOR AUTOMATIC GENERATION OF A SPECIFICATION FOR AN IT TOPOLOGY OF A CONTROL SYSTEM

(71) Applicant: ABB Schweiz AG, Baden (CH)

(72) Inventors: Andreas Burger, Weingarten (DE); Heiko Koziolek, Karlsruhe (DE); Pablo Rodriguez, Ilvesheim (DE); Rhaban Hark, Weiterstadt (DE)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 18/474,668

(22) Filed: Sep. 26, 2023

(65) Prior Publication Data

US 2024/0106715 A1    Mar. 28, 2024

(30) Foreign Application Priority Data

Sep. 28, 2022  (EP) .................................. 22198441

(51) Int. Cl.
*H04L 41/12* (2022.01)
*H04L 41/0823* (2022.01)

(52) U.S. Cl.
CPC .......... *H04L 41/12* (2013.01); *H04L 41/0823* (2013.01)

(58) Field of Classification Search
CPC .............................. H04L 41/12; H04L 41/0823
See application file for complete search history.

(56) References Cited

U.S. PATENT DOCUMENTS

| | | | |
|---|---|---|---|
| 2009/0282067 A1 | 11/2009 | Bendigeri et al. | |
| 2012/0087665 A1* | 4/2012 | Li | H04L 41/12 398/79 |
| 2019/0041830 A1 | 2/2019 | Yarvis et al. | |
| 2021/0048800 A1 | 2/2021 | Wendelberger et al. | |

FOREIGN PATENT DOCUMENTS

| | | | |
|---|---|---|---|
| EP | 2146259 B1 | 5/2017 | |
| EP | 2827203 B1 | 9/2018 | |
| EP | 3926423 A1 | 12/2021 | |
| WO | WO-2016053306 A1 * | 4/2016 | .......... H04L 41/0883 |
| WO | WO-2020198249 A1 * | 10/2020 | .......... G05B 19/0426 |

OTHER PUBLICATIONS

European Patent Office, Extended European Search Report in European Patent Application No. 22198441.2, 9 pp. (Mar. 17, 2023).

* cited by examiner

*Primary Examiner* — Philip C Lee
(74) *Attorney, Agent, or Firm* — Leydig, Voit & Mayer, Ltd.

(57) ABSTRACT

A method for automatic generation of a specification for an IT topology of a control system, the method comprising: creating a system structure from a machine-readable data defining production process requirements and generating specification data of the IT topology based on the extracted system structure; optimizing the generated specification data of the IT topology by utilization of pre-defined rules and generating abstract aggregated IT topology data based on the optimized specification data; and instantiating and mapping the abstract aggregated IT topology data to specific technology instance data.

17 Claims, 4 Drawing Sheets

METHOD AND SYSTEM FOR AUTOMATIC GENERATION OF A SPECIFICATION FOR AN IT TOPOLOGY OF A CONTROL SYSTEM

CROSS-REFERENCE TO RELATED APPLICATIONS

The instant application claims priority to European Patent Application No. 22198441.2, filed Sep. 28, 2022, which is incorporated herein in its entirety by reference.

FIELD OF THE DISCLOSURE

The present disclosure generally relates to a method and a system for automatic generation of a specification for an IT topology of a control system.

BACKGROUND OF THE INVENTION

Customers expect for future distributed control systems that vendors move towards a standards-based, open, secure, and interoperable process automation architecture which is fit for-purpose for the asset owner's need. This includes the expectation of a reduction of lifecycle costs of automation and enabling an easier adoption of new technologies incrementally.

BRIEF SUMMARY OF THE INVENTION

In one aspect of the present disclosure, a method for automatic generation of a specification for an IT topology of a control system is provided, the method comprising: creating a system structure from a machine-readable data defining production process requirements and generating specification data of the IT topology based on the extracted system structure; optimizing the generated specification data of the IT topology by utilization of pre-defined rules and generating abstract aggregated IT topology data based on the optimized specification data; and instantiating and mapping the abstract aggregated IT topology data to specific technology instance data.

Certain embodiments of the present disclosure are implemented in a method for automatically generating the information technology (IT) system topology of an IT system from traditional engineering artifacts to reduce the manual effort in the generation process as well as to increase the quality of the specification.

The present disclosure provides in advantageous manner that the machine-readable data does not need to directly define the IT topology (i.e., servers, workstations, applications), but only indirectly (via required I/O points, such as sensor readings defines the IT topology.

The upcoming trend of open architectures, reduced vendor lock in, and the wish for faster adoption of new technology trends and solutions, change the traditional workflows in process automation.

Especially the specification of such systems needs to be simplified to allow customers to migrate to new technologies and solutions. The usage of cloud-native technologies, which are state-of-the-art in IT environments, can support this trend for open and interoperable process automation architectures and enable plant owners/process owners to migrate easily from existing technologies and solutions to new ones as well as enable scalability and adaptation in changing environments/demands.

Nevertheless, traditional engineering workflows are not foreseen to be used together with standard IT cloud-native workflows. This starts from the input artifacts for engineering like P&IDs documents, which specify the entire process with all its dimensions (e.g., process medium flow, process control, and sensors/actuators), over control narratives, which describe in natural language how the system should behave in a particular situation, till I/O lists, which specify the number and types of devices as well as how they can be identified.

All these artifacts need to be input resources for generating an Operation Technology (OT) system specification including the IT topology of the automation system. Obviously, they are not compatible with standard state-of-the-art generic IT mechanism/IT specifications. On the other hand, writing IT (topology) specifications is laborious and error-prone, especially as current engineering workflows do not foresee such specification within the engineering process of an automation system.

Finally, creating an overall price estimation for the needed IT equipment depends mainly on the experience and manual effort of the engineering engineers and cannot be automated.

BRIEF DESCRIPTION OF THE SEVERAL VIEWS OF THE DRAWING(S)

DETAILED DESCRIPTION OF THE INVENTION

The following embodiments are mere examples for the method and the system disclosed herein and shall not be considered limiting.

Figure 1:
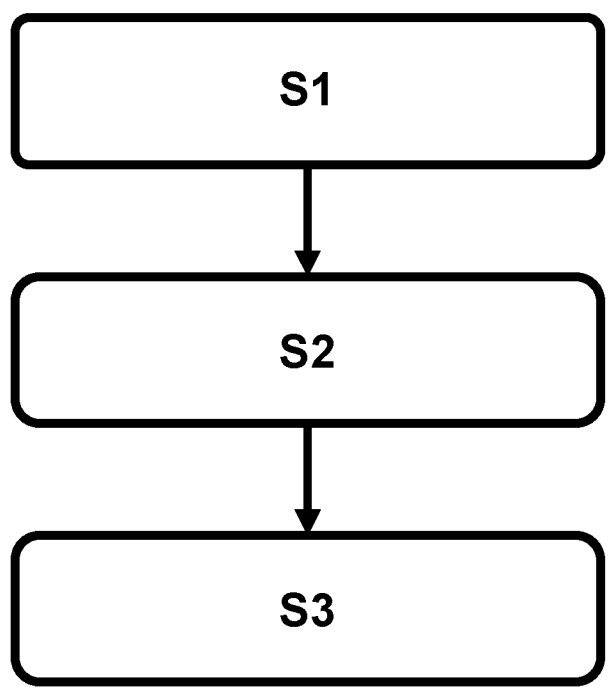
FIG. 1 is a flowchart for a method for automatic generation of a specification for an IT topology of a control system, in accordance with the disclosure.
Figure 2:
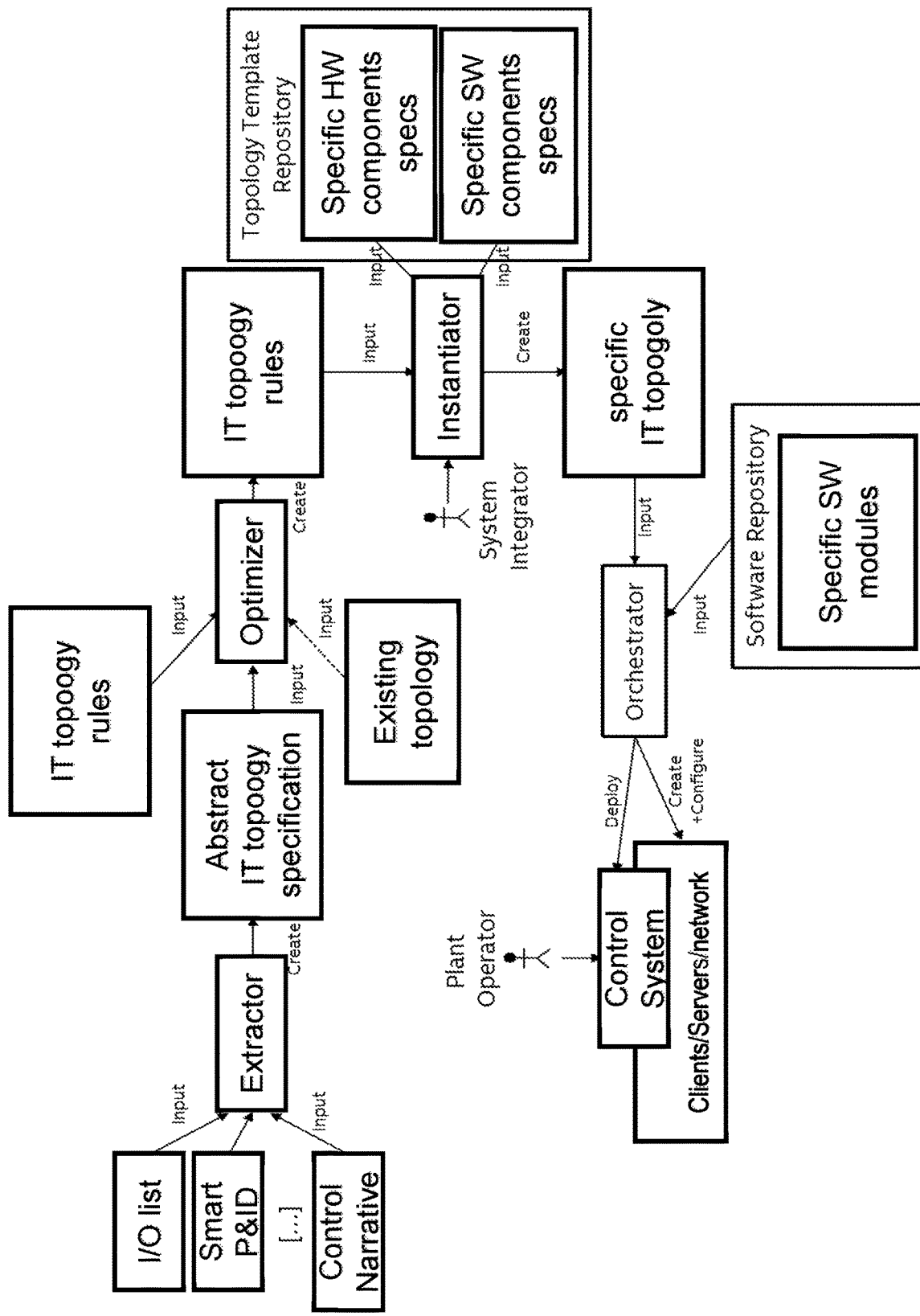
FIG. 2 is a block diagram of an exemplary a system for automatic generation of a specification for an IT topology of a control system, in accordance with the disclosure.

FIG. 1 illustrates a workflow of a method for automatic generation of a specification for an IT topology of a control system. FIG. 2 illustrates an example of a system for automatic generation of a specification for an IT topology of a control system.

The present disclosure describes a system and method to automatically generate a generic IT system topology by using traditional engineering artifacts such us P&IDs, I/O lists, control narratives as input. The system and method proposed in this disclosure includes an incremental method going from abstract to a concrete output.

The method initially starts with a creation 51 or an extraction Step: Identify plant elements in engineering artifacts such as P&IDs, I/O lists, Control narratives or Control diagrams relevant for the configuration of the control system. In P&IDs can be identified instrumentation to measure process values, actuators such as motors, pumps, valves to influence the process and PID loops to control the process.

There are also logical connections in P&IDs to depict which elements are involved in the control of a specific part of the process such as the level in a tank to be controlled with a PID control loop using a control valve. Typically, there is enough information in the exports from the CAE tools based on standards such as DEXPI about the plant elements, otherwise it is necessary to enrich the information with other engineering artifacts.

For instance, the I/O list contains the signals used by the control application. In control narratives are described the normal operation procedures, protections functions, and the interactions between plant elements. By using Natural Language Processing (NLP) it is possible to extract this information semi-automatically and create the specification data. This step is optional and not necessary for running the system and method for generating a generic IT topology specification for an OT system.

The method further comprises an Optimization Step S2: An additional part of the invention is the utilization of user defined rules to optimize the IT topology. These rules will be provided by the user. For instance, to group multiple control applications to the same executing node if the name of the actuators and instruments share a common prefix or to group small control application with a limited number of I/Os on the same IT compute node.

The result is an aggregated abstract IT topology specification optimized by the needs of the user. Once the information extraction phase is finished, the first abstract version of the IT topology specification is generated with the following rules: For each plant control element a generic IT computer node is created, hosting a generic execution engine. For each instrument an output signal is created and for each actuator input and output signals are created. All signals are mapped to a generic IO engine hosted on a generic IT compute node.

The method further comprises an instantiation step according to an exemplary embodiment: This step is to create a specific IT topology specification for the envisioned OT system by using vendor specific catalogs/libraries of software and hardware components to be instantiated for the industrial process. It is part of the invention to use a catalog of basic products such as 61131 execution engines, computers, network switches but also to include specific libraries provided by vendors enabling a full customization of the final IT topology of the OT system.

Figure 4:
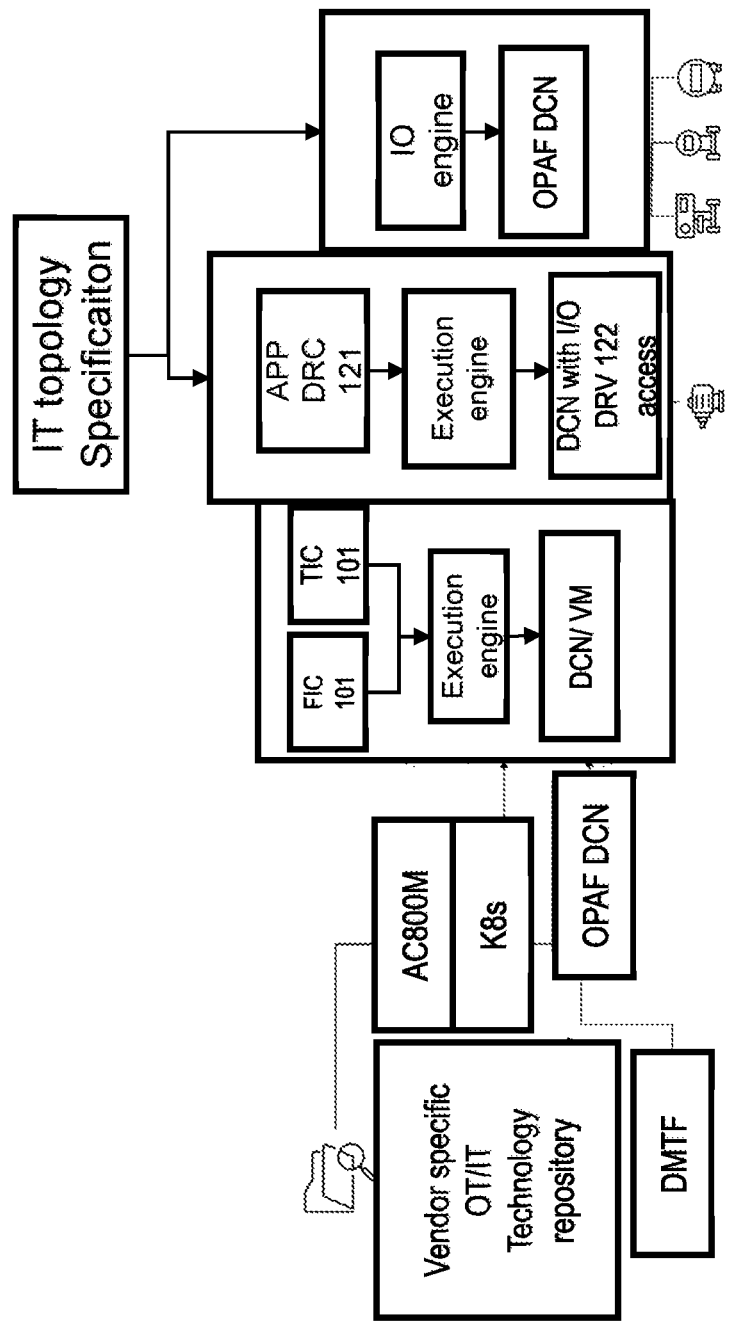
FIG. 4 is an exemplary concrete IT topology specification for the envisioned OT system with vendor specific technology choices, in accordance with the disclosure.

The result is a specific IT topology specification including vendor specific technology choices and concrete instances, as shown in FIG. 4. This specification can be used to create a cost estimation of the final system. Additionally, the IT topology specification can be used by an Orchestrator that ensures that all devices in the OT system will be deployed and configured.

Figure 3:
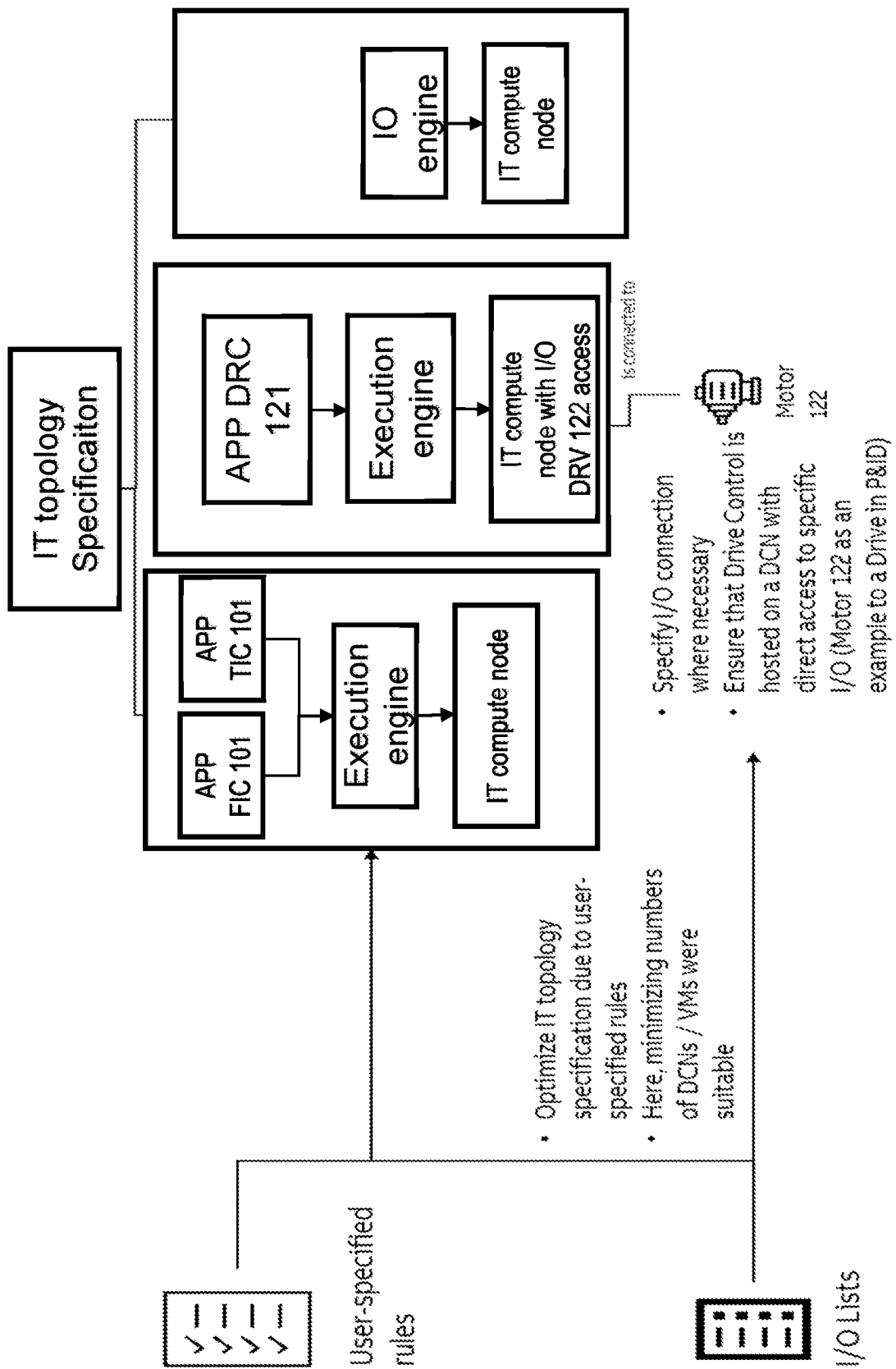
FIG. 3 is a flowchart for an aggregated abstract IT topology specification optimized by the needs of the user, in accordance with the disclosure.

FIG. 3 illustrates a workflow of an aggregated abstract IT topology specification optimized by the needs of the user. FIG. 4 illustrates an example of concrete IT topology specification for the envisioned OT system with vendor specific technology choices. The result is a specific IT topology specification including vendor specific technology choices and concrete instances, as shown in FIG. 4. This specification can be used to create a cost estimation of the final system. Additionally, the IT topology specification can be used by an Orchestrator that ensures that all devices in the OT system will be deployed and configured.

In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

In an embodiment of the method for automatic generation of a specification for an IT topology of a control system according to an exemplary embodiment, the method further comprises the step of an automatic cost estimation of the IT topology.

In an embodiment of the method for automatic generation of a specification for an IT topology of a control system according to an exemplary embodiment, the system elements of the IT topology are software modules and/or hardware components.

In an embodiment of the method for automatic generation of a specification for an IT topology of a control system according to an exemplary embodiment, the pre-defined rules are used to group multiple control applications to the same executing node if the name of the actuators and instruments share a common prefix.

In an embodiment of the method for automatic generation of a specification for an IT topology of a control system according to an exemplary embodiment, the specific technology instance data comprises data defining IT nodes, capable to execute control logic, or data defining software modules, or data defining server structures.

In an embodiment of the method for automatic generation of a specification for an IT topology of a control system according to an exemplary embodiment, the generating specification data of the IT topology based on the extracted system structure comprises mapping controllers, actuators, or sensors of the IT topology.

In an embodiment of the method for automatic generation of a specification for an IT topology of a control system according to an exemplary embodiment, the machine-readable data comprises P&IDs, I/O lists, control narratives or control diagrams relevant for the configuration of the IT topology.

In an embodiment of the method for automatic generation of a specification for an IT topology of a control system according to an exemplary embodiment, the method further comprises the step of an automatic cost estimation of the IT topology based on the specific technology instance data.

In an embodiment of the method for automatic generation of a specification for an IT topology of a control system according to an exemplary embodiment, the optimizing of the generated specification data of the IT topology comprises optimizing the IT topology with regard to location, structure, topology, costs or user requirements.

In an embodiment of the method for automatic generation of a specification for an IT topology of a control system according to an exemplary embodiment, the data defining the IT topology comprises P&IDs, I/O lists, control narratives or control diagrams relevant for the configuration of the IT topology of the control system.

In an embodiment of the method for automatic generation of a specification for an IT topology of a control system according to an exemplary embodiment, the data defining the IT topology comprises information is stored in a generic IT topology specification by using abstract types.

In an embodiment of the method for automatic generation of a specification for an IT topology of a control system according to an exemplary embodiment, the pre-defined rules are defined by a user during execution of the method or beforehand or the pre-defined rules are activated during execution of the method.

In an embodiment of the method for automatic generation of a specification for an IT topology of a control system according to an exemplary embodiment, the pre-defined rules are applied based on the target domain of the IT topology specification, optionally for power-plants, papermills or chemical production plants.

In an embodiment of the method for automatic generation of a specification for an IT topology of a control system, the pre-defined rules are used to group multiple control applications to the same executing node if the name of the actuators and instruments share a common prefix.

In one aspect, a system for automatic generation of a specification for an IT topology of a control system is presented, the system comprising a processor for executing the method according to the first aspect.

Any disclosure and embodiments described herein relate to the method and the system, lined out above and vice versa. Advantageously, the benefits provided by any of the embodiments and examples equally apply to all other embodiments and examples and vice versa.

As used herein "determining" also includes "initiating or causing to determine", "generating" also includes "initiating or causing to generate" and "providing" also includes "initiating or causing to determine, generate, select, send or receive". "Initiating or causing to perform an action" includes any processing signal that triggers a computing device to perform the respective action.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for automatic generation of a specification for an information technology (IT) topology of a control system, the method comprising:
   generating specification data of the IT topology by extracting the specification data, using natural language processing, from machine-readable data that defines production process requirements and an extracted system structure that comprises mapping controllers, actuators, or sensors of the IT topology;
   creating a system structure from the machine-readable data;
   optimizing the generated specification data of the IT topology by utilization of pre-defined rules and generating abstract aggregated IT topology data based on the optimized specification data, wherein the predefined rules are used to group multiple control applications to a same executing node if a name of the actuators and instruments share a common prefix; and
   instantiating and mapping the abstract aggregated IT topology data to specific technology instance data.

2. The method according to claim 1, wherein the machine-readable data comprises P&IDs, I/O lists, control narratives or control diagrams relevant for a configuration of the IT topology.

3. The method according to claim 1, wherein system elements of the IT topology are software modules and/or hardware components.

4. The method according to claim 1, wherein the method further comprises the step of an automatic cost estimation of the IT topology based on the specific technology instance data.

5. The method according to claim 1, wherein the specification data defining the IT topology comprises information that is stored in a generic IT topology specification by using abstract types.

6. The method according to claim 1, wherein the pre-defined rules are defined by a user during execution of the method or beforehand or the pre-defined rules are activated during execution of the method.

7. The method according to claim 1, wherein the pre-defined rules are applied based on a target domain of the IT topology specification for power-plants, papermills or chemical production plants.

8. The method according to claim 1, wherein the specific technology instance data comprises data defining IT nodes, capable to execute control logic, or data defining software modules, or data defining server structures.

9. The method according to claim 1, wherein the optimizing of the generated specification data of the IT topology comprises optimizing the IT topology with regard to location, structure, topology, costs or user requirements.

10. A system for automatic generation of a specification for an information technology (IT) topology of a control system, the system comprising a processor for executing a method, the method comprising:
    generating specification data of the IT topology by extracting the specification data, using natural language processing, from machine-readable data that defines production process requirements and an extracted system structure that comprises mapping controllers, actuators, or sensors of the IT topology;

creating a system structure from the machine-readable data;

optimizing the generated specification data of the IT topology by utilization of pre-defined rules and generating abstract aggregated IT topology data based on the optimized specification data, wherein the predefined rules are used to group multiple control applications to a same executing node if a name of the actuators and instruments share a common prefix; and instantiating and mapping the abstract aggregated IT topology data to specific technology instance data.

11. The system according to claim 10, wherein the machine-readable data comprises P&IDs, I/O lists, control narratives or control diagrams relevant for a configuration of the IT topology.

12. The system according to claim 10, wherein system elements of the IT topology are software modules and/or hardware components.

13. The system according to claim 10, wherein the method further comprises the step of an automatic cost estimation of the IT topology based on the specific technology instance data.

14. The system according to claim 10, wherein the specification data defining the IT topology comprises information that is stored in a generic IT topology specification by using abstract types.

15. The system according to claim 10, wherein the pre-defined rules are defined by a user during execution of the method or beforehand or the pre-defined rules are activated during execution of the method.

16. The system according to claim 10, wherein the pre-defined rules are applied based on a target domain of the IT topology specification for power-plants, papermills or chemical production plants.

17. The system according to claim 10, wherein the specific technology instance data comprises data defining IT nodes, capable to execute control logic, or data defining software modules, or data defining server structures.

* * * * *